(12) United States Patent
Pankajakshan et al.

(10) Patent No.: US 10,285,074 B1
(45) Date of Patent: May 7, 2019

(54) CONTROLLING NETWORK LOAD

(75) Inventors: Bejoy Pankajakshan, Olathe, KS (US); Warren Bruce Cope, Olathe, KS (US); Jamie Paul Brocket, Raytown, MO (US); Tae-Woo Cha, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 428 days.

(21) Appl. No.: 13/041,554

(22) Filed: Mar. 7, 2011

(51) Int. Cl.
| H04W 24/02 | (2009.01) |
| H04W 28/16 | (2009.01) |
| H04W 72/06 | (2009.01) |
| H04W 28/02 | (2009.01) |
| H04W 76/00 | (2018.01) |
| H04W 76/19 | (2018.01) |
| H04W 36/00 | (2009.01) |
| H04W 28/08 | (2009.01) |

(52) U.S. Cl.
CPC .......... *H04W 24/02* (2013.01); *H04W 28/16* (2013.01); *H04W 76/19* (2018.02); *H04W 28/08* (2013.01); *H04W 36/0079* (2018.08)

(58) Field of Classification Search
CPC ...... H04W 36/16–36/36; H04W 24/02–24/10; H04W 76/027–76/028; H04W 76/18–76/19; H04L 5/0089
See application file for complete search history.

(56) References Cited

U.S. PATENT DOCUMENTS

| 2009/0046665 A1* | 2/2009 | Robson et al. ............... 370/332 |
| 2009/0097451 A1* | 4/2009 | Gogic ........................... 370/331 |
| 2010/0014426 A1* | 1/2010 | Cavalli et al. ................ 370/235 |
| 2010/0214943 A1* | 8/2010 | Immendorf et al. .......... 370/252 |
| 2010/0298005 A1* | 11/2010 | Yavuz ................. H04W 52/244 455/452.2 |
| 2011/0176424 A1* | 7/2011 | Yang ................... H04L 41/0803 370/236.2 |
| 2011/0223918 A1* | 9/2011 | Dahlen ................. H04W 24/00 455/436 |
| 2011/0244866 A1* | 10/2011 | Yamamoto ............ H04W 36/22 455/438 |
| 2011/0244870 A1* | 10/2011 | Lee ..................... H04W 52/244 455/444 |
| 2013/0028193 A1* | 1/2013 | Rommer ............... H04W 28/26 370/328 |

FOREIGN PATENT DOCUMENTS

WO   WO 2010071374 A2 *  6/2010   .......... H04W 52/244

OTHER PUBLICATIONS

Osterling, Wireless Telecommunications System, May 22, 2008, Ericssson; WO2008058551.*

* cited by examiner

*Primary Examiner* — Marcus Smith (57) ABSTRACT

Systems, methods, and computer-readable media, for facilitating control of network loads are provided. In embodiments of the present invention, network data associated with a plurality of base stations within a communications network are monitored. Upon identifying that a network load associated with a base station exceeds a network load threshold, an indication that a user device utilizing the base station that exceeds the network load threshold to communicate should transfer to another base station that fails to exceed the network load threshold is provided.

20 Claims, 6 Drawing Sheets

FIG. 6

CONTROLLING NETWORK LOAD

BRIEF SUMMARY

A high-level overview of various aspects of the invention are provided here for that reason, to provide an overview of the disclosure, and to introduce a selection of concepts that are further described in the detailed-description section below. This summary is not intended to identify key features or essential features of the claimed subject matter, nor is it intended to be used as an aid in isolation to determine the scope of the claimed subject matter.

In brief, and at a high level, this disclosure describes, among other things, facilitating control of network loads. Performance of one or more computing devices utilizing a network for communication, such as a radio access network, can be modified based on real-time traffic data and corresponding network loads. Such data can be utilized to enhance user quality of experience by managing disruptive traffic flows. In this regard, user devices can be transferred from one base station to another base station based on network flow. That is, in accordance with monitoring a heavy traffic flow associated with a particular base station to which a user device is connected, the user device can transfer to another base station with a lighter traffic flow, which may result in an enhanced user experience for the device user as well other network users. Additionally or alternatively, performance of a user device, user, or application may be modified (e.g., throttled or upgraded) in accordance with monitored network nodes.

BRIEF DESCRIPTION OF THE DRAWINGS

Illustrative embodiments of the present invention are described in detail below with reference to the attached drawing figures, and wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of the methods employed, the terms should not be interpreted as implying any particular order among or between various steps herein disclosed unless and except when the order of individual steps is explicitly described.

Embodiments of the present invention provide systems, methods, and computer-readable media for controlling network loads. Utilizing embodiments hereof, network load is monitored to facilitate a user device(s) connection with or utilization of a particular base station within the network. In this regard, a device connection with a particular base station or transfer from a particular base station can be influenced in accordance with network loads of base stations within the network.

Throughout the description of embodiments of the present invention, several acronyms and shorthand notations are used to aid the understanding of certain concepts pertaining to the associated methods, systems, and computer-readable media. These acronyms and shorthand notations are solely intended for the purpose of providing an easy methodology of communicating the ideas expressed herein and are in no way meant to limit the scope of the present invention. The following is a list of these acronyms:

3G Third-Generation Wireless Technology
4G Fourth-Generation Cellular Communication System
CD-ROM Compact Disk Read Only Memory
CDMA Code Division Multiple Access
GIS Geographic/Geographical/Geospatial Information System
GPRS General Packet Radio Service
GSM Global System for Mobile communications: originally from Groupe Spécial Mobile
DVD Digital Versatile Discs
EEPROM Electrically Erasable Programmable Read Only Memory
HA Home Agent
LED Light Emitting Diode
LTE Long Term Evolution
PC Personal Computer
PCRF Policy Charging Resource Function
PDA Personal Digital Assistant
PGW Packet Data Network Gateway
RAM Random Access Memory
ROM Read Only Memory
RNC Radio Network Controller
SLA Service Level Agreement
SPS Subscription Profile Server
TDMA Time Division Multiple Access Further, various technical terms are used throughout this description. An illustrative resource that fleshes out various aspects of these terms can be found in Newton's Telecom Dictionary, 25th Edition (2009).

Embodiments of the technology may take the form of, among other things: a method, system, or set of instructions embodied on one or more computer-readable media. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
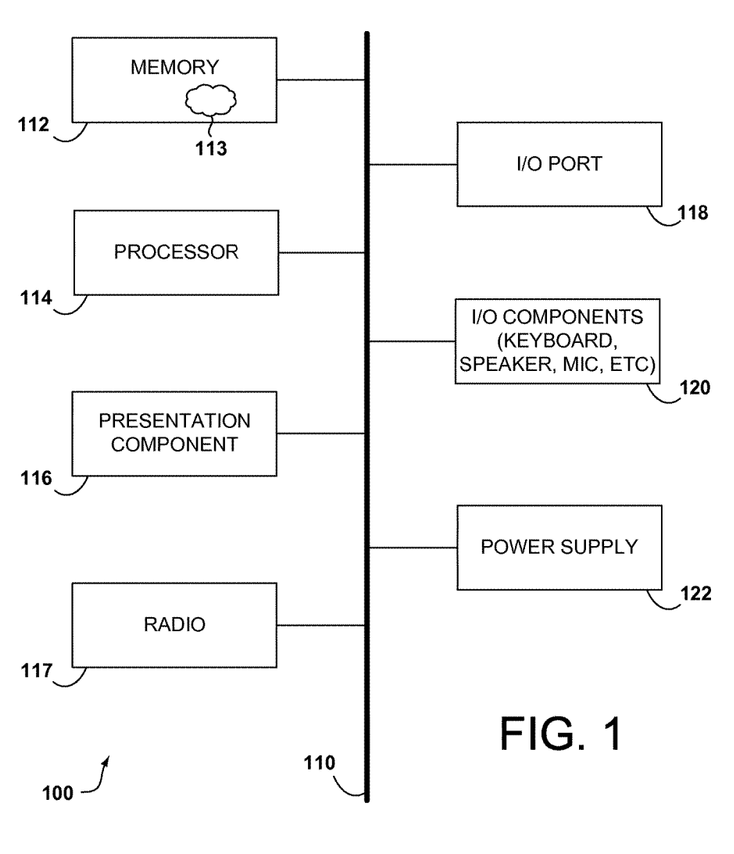
FIG. 1 depicts an exemplary computing device according to embodiments of the present invention.

Referring to the drawings in general, and initially to FIG. 1 in particular, a block diagram of an illustrative communications device according to one embodiment is provided and referenced generally by the numeral 100. Although some components are shown in the singular, they may be plural. For example, communications device 100 might include multiple processors or multiple radios, etc. As illustratively shown, communications device 100 includes a bus 110 that directly or indirectly couples various components together including memory 112, a processor 114, a presentation component 116, a radio 117 (if applicable), input/output ports 118, input/output components 120, and a power supply 122.

Memory 112 might take the form of memory components previously described. Thus, further elaboration will not be provided here, only to say that memory component 112 can include any type of medium that is capable of storing information (e.g., a database). A database can be any collection of records. In one embodiment, memory 112 includes a set of embodied computer-executable instructions 113 that, when executed, facilitate various aspects disclosed herein. These embodied instructions will variously be referred to as "instructions" or an "application" for short.

Processor 114 might actually be multiple processors that receive instructions and process them accordingly. Presentation component 116 includes the likes of a display, a speaker, as well as other components that can present information (such as a lamp (LED), or even lighted keyboards).

Numeral 117 represents a radio that facilitates communication with a wireless-telecommunications network. Illustrative wireless telecommunications technologies include CDMA, GPRS, TDMA, GSM, and the like (including what is known in the art as WiMax technology and also Long Term Evolution (LTE). In some embodiments, radio 117 might also facilitate other types of wireless communications including Wi-Fi communications and GIS communications.

Input/output port 118 might take on a variety of forms. Illustrative input/output ports include a USB jack, stereo jack, infrared port, proprietary communications ports, and the like. Input/output components 120 include items such as keyboards, microphones, speakers, touch screens, and any other item usable to directly or indirectly input data into communications device 100. Power supply 122 includes items such as batteries, fuel cells, or any other component that can act as a power source to power communications device 100.

As previously mentioned, embodiments of the present invention facilitate controlling network load or congestion to enable a device(s) to transfer to or use another base station with less utilization or load. In this regard, a network (e.g., RAN) is monitored in real time such that a device utilizing a base station with a heavy traffic load can be transferred to an acceptable base station with a lighter traffic load. Such a base station transfer can benefit the transferring device as well as other devices that might be required or preferred to utilize the base station with the initially heavier traffic load.

By way of example only, assume that a first device utilizes a first base station having heavier traffic flow but, based on the location of the first device, could also be using a second base station having a lighter traffic flow. Now assume that a second device attempts to place a voice call using the first base station having the heavier traffic flow as such a base station is the only base station available to the second device (e.g., based on location of second device, signal strength, etc.). If the first base station with the heavier traffic load is at capacity, the voice call initiated by the second device may fail. However, if the first device that is capable of using the second base station with the lighter traffic flow is transferred to that base station, the first base station having the initially heavier traffic flow may be available for use of the voice call initiated by the second device.

According, in one aspect, the present invention is directed to one or more computer-readable media having computer-executable instructions embodied thereon that, when executed, perform a method for facilitating distribution of policy decision functions. The method includes utilizing a first base station within a network to communicate during a communication event. An indication is received from a remote component to transfer to a second base station. A transfer of a user device from using the first base station during the communication event to using a second base station during the communication event is initiated.

In another aspect, embodiments of the present invention are directed to one or more computer-readable media having computer-executable instructions embodied thereon that, when executed, perform a method for facilitating control of network loads. The method includes monitoring network data associated with base stations within a communications network. It is identified that a network load associated with one of the base stations exceeds a network load threshold. An indication is provided that at least one user device utilizing the base station that exceeds the network load threshold to communicate should transfer to another base station that fails to exceed the network load threshold.

In yet another aspect, a method for facilitating control of network loads is provided. Data associated with a load of a first base station within a network is received, and data associated with a load of a second base station within the network is received. Based on the data indicating that the load of the first base station exceeds a load threshold and that the load of the second base station fails to exceed the load threshold, a determination is made that a user device initially using the first base station to communicate should transfer to use the second base station within the network. An indication that the user device initially using the first base station should transfer to use the second base station within the network to communicate is communicated.

Figure 2:
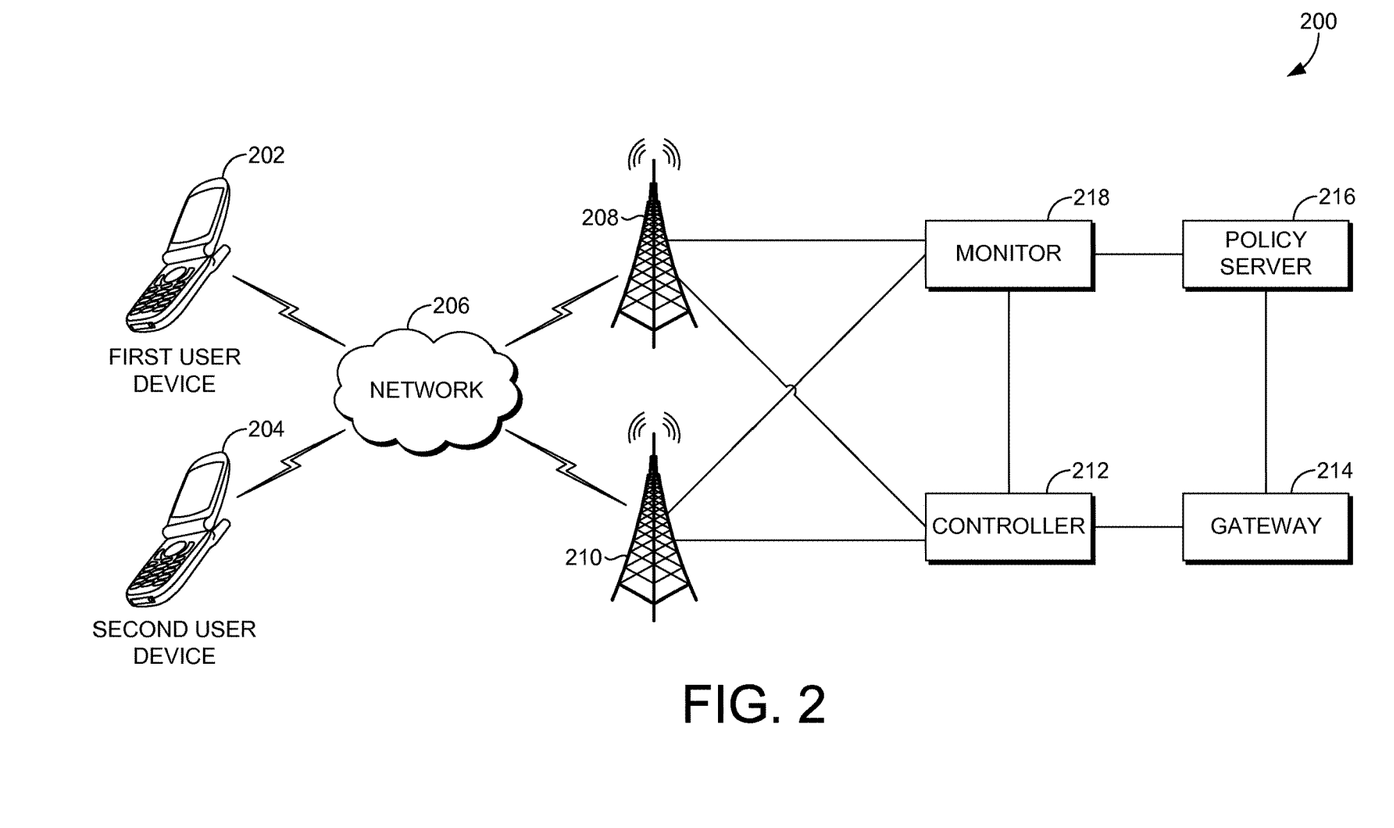
FIG. 2 is a schematic view of an exemplary communications environment suitable for use in implementing embodiments of the present invention.

Turning now to FIG. 2, an exemplary network environment suitable for use in implementing embodiments of the present invention is illustrated and designated generally as network environment 200. Network environment 200 is but one example of a suitable network environment and is not intended to suggest any limitation as to the scope of use or functionality of the invention. Neither should the network environment be interpreted as having any dependency or requirement relating to any one or combination of components illustrated.

In the network environment 200, a user device 202 and a user device 204 may communicate using the network environment 200. The user device 202 and/or the user device 204 may take on a variety of forms, such as a personal computer (PC), a laptop computer, a mobile phone, a personal digital assistant (PDA), a server, or any other device that is cable of communicating with other devices. Makers of illustrative devices include, for example, Research in Motion, Creative Technologies Corp., Samsung, Apple Computer, and the like. A device can include, for example, a display(s), a power source(s) (e.g., a battery), a data store(s), a speaker(s), memory, a buffer(s), and the like. In embodiments, a user device comprises a wireless or mobile device with which a wireless telecommunications network is utilized for communication. In this regard, the device communicates with other devices using a wireless telecommunications network(s).

The user device 202 and user device 204 are capable of communicating with other devices over established radio frequencies via base stations 208 and 210. The user device 202 and user device 204 may utilize a network 206 to communicate by way of base stations 208 and 210. Network 206 may include any type of network, such as an air interface network used to connect the user devices to the base stations, a radio access network, a cable network, a wireless network, e.g., 3G or 4G, a combination thereof, and the like. The network 206 may include any number of networks including a network of networks. In embodiments, base stations 208 and 210 communicate over a wireless air interface utilizing a wireless access network, such as 3G, 4G, CDMA, GPRS, GSM, TDMA, Wi-Fi, WIMAX, or the like.

The base stations 208 and 210 communicate with a controller 212. The controller 212, such as a radio network controller (RNC), controls nodes (e.g., Node Bs) connected thereto. In embodiments, a controller 212 is a RNC used for radio resource management and functions in connection with an access network. The controller 212 can communicate with the gateway 214. Gateway 214, such as a HA or PGW gateway, is used to allow or control access to another computer or network. In embodiments, the gateway 214 is an access gateway that may perform protocol conversion to convert signals from a first signal to a second signal.

The gateway 214 can communicate with a policy server 216. The policy server 216, such as a Policy Charging and Rules Function (PCRF), is used to perform initialization or setup of communication events within a network(s). Traditionally, the policy server 216 makes intelligent policy decisions for users or user devices of the network. The policy server 216 may include or access a database or server (not shown), such a profile server (e.g., a subscription profile server (SPS)), that can include user or subscriber information associated with a user device(s), such as user devices 202 and 204, or a user(s) associated therewith. Accordingly, a policy(s) associated with a user device(s) or user(s) thereof may be stored in connection with the profile server and utilized to make policy decisions.

As utilized herein, the term "policy" refers to one or more policy attributes that indicate a use of resources (e.g., data usage, time usage, quality of service, thresholds thereof, etc.) within a network. The term "policy attribute" may indicate a quality of service for a communication event(s) or a threshold or range of quality of service for a communication event. As such, a policy attribute may be associated with threshold, range, or user device (or user) usage of a priority, a reliability, a speed, a traffic amount, a throughput, a bandwidth, a transit delay, a jitter, a loss ratio, an error rate, a latency control, a signal strength, or the like.

A communication event refers to any type of communication event including, but not limited to, an audio event, e.g., a ring tone download, an audio stream download, and a voice call; a video event, e.g., a clip or video stream download; a data event, e.g., a web page download, a data submission, a search; a text event, e.g., a text message, an instant message, or electronic message, etc.; any other data flow associated with an IP address; and the like. In one embodiment, a communication event may refer to the all of the data flow between a user device and a recipient in one session. In such a case, a session may end when the data flow between the user device and the recipient ends. For example, assume a user accesses a web page. As such, the communication event may include the web page download as well as all data flow between the user device and the web page server until the data flow ends. The data flow may end upon the user closing the web browser, accessing a different web page having a different IP address, logging off the computer, and the like.

A policy, or portion thereof, may be associated with one or more communication events. In one embodiment, a policy may be based on a user or a group of users. For example, a policy may apply to a user or a group of users, such as a high priority user group (e.g., a group that utilizes more services or pays for more services). Such a policy may include various portions, i.e., policy portions, that apply to specific events, such as video downloading, audio downloading, and website downloading. Accordingly, one policy portion having a set of policy attributes may be applied in an instance where a user downloads a web page while another policy portion having a set of policy attributes may be applied in an instance where the user downloads a video. In another embodiment, a policy may be based on a recipient. For example, a policy may apply to any user that initiates communication with a specific recipient (e.g., a website). One skilled in the art will recognize that a policy, policy portion, and/or policy attributes may be associated with any combination of users, communication event types, recipients, communication event time, communication event location, and the like, in accordance with embodiments hereof.

The monitor 218 communicates with network elements or nodes, such as base station 208, base station 210, and/or controller 212 to monitor data traffic within a network (e.g., a radio access network). In this regard, the monitor may receive or retrieve network data, such as bearer data and signaling data, from various nodes within the network. Network data refers to data that indicates or can be used to indicate traffic flow or congestion within a network. As can be appreciated, the monitor 218 may obtain network data from any number of network elements and nodes including, for instance, base stations, controllers, gateways, etc. In embodiments, the monitor 218 may receive or retrieve network data continually, periodically, or upon an occurrence of event, such as, initiation of a communication event associated with a user device, registration of a user device, at a particular time after a communication event, upon expiration of a time duration after a communication event begins, etc.

In embodiments, the monitor 218 can aggregate network data from various network elements or nodes and, in some cases, may modify or convert the raw data into a standardized type of data. In some cases, the monitor 218 may aggregate network data associated with a particular user device, or user thereof. In other cases, the monitor 218 may aggregate data based on other related data, such as network data for an entire network, network data associated with a particular group of user device or users, network data associated with a particular base station(s), controller(s), and/or gateway(s), or the like.

The monitor 218 may also be configured to analyze obtained network data. In this regard, the monitor 218 may analyze load, traffic flow, congestion, and/or performance for a particular device or set of devices, a particular network, a particular network element or set of elements (e.g., base stations, controllers, gateways, etc.), and/or the like. Analyzing network data or aggregated network data may result in performing calculations and/or making various determinations in accordance with the network data.

In some embodiments, the monitor 218 is configured to make network control determinations and/or device transfer determinations. A network control determination refers to a decision or determination made pertaining to load, congestion, traffic flow, or performance of a network, or a portion thereof (e.g., a base station). In this regard, a determination may be made that a base station is highly congested or has a heavy load, that a base station is not congested or has a light load, an amount or extent of congestion or load (e.g., a load percent, a load ratio, or other load indicator), that performance of a user device, user, application, etc. should be throttled or upgraded, or the like.

A device transfer determination refers to a decision or determination made pertaining to whether a user device(s) should utilize a particular base station or transfer from one base station to another base station. For example, in accordance with a heavy load at a base station being utilized by a particular user device, a device transfer determination may be made that such the user device should transfer to another, less utilized, base station. Such a device transfer determination may also include an indication of an alternative base station to which the user device should transfer; a time, a lapse of a time duration, or an occurrence of an event upon which the user device should transfer; etc.

To make such network control determinations and/or device transfer determinations, the monitor 218 may compare monitored network data (e.g., network data, aggregated network data, converted network data, calculated network data, etc.) to thresholds. For example, when a particular threshold is exceeded, such as a load rate or percent threshold for a particular base station, a determination can be made that a user device should transfer to another base station with a lower load. As raw network data, converted network data, aggregated network data, analyzed or calculated network data can be utilized to make network control decisions and/or device transfer decisions, the phrase "monitored network data" may be utilized throughout to represent such variations of data received or modified by the monitor 218.

In some cases, the monitor 218 can base network control determinations and/or device transfer determinations based on quality of services expected or intended to be provided to a user device or user. For example, the monitor 218 may determine that a user device should transfer to another base station when the user device is participating in a voice call, but not transfer base stations when participating in a data session. In this regard, the monitor 218 may consider service level agreements, a type of service being provided or intended to be provided, a priority level of the user or user device, an emergency situations, an intended or ongoing communication event, etc.

As can be appreciated, the monitor 218 may make such determinations upon receiving network data, upon performing analysis or aggregation of network data, upon initiation of a communication event, continually, periodically, etc. In this way, transferring base stations may occur at the initiation of a communication event or during a communication event (e.g., as network load increases or another device requires use of a base station).

As illustrated in FIG. 2, the monitor 218 can communicate with the policy server 216. In some embodiments, the monitor 218 communicates monitored network data to the policy server 216 such that the policy server 216 can make network control determinations and/or device control determinations. The monitor 218 may communicate monitored network data to the policy server 216 upon monitored network data exceeding a threshold. For instance, assume that a particular base station exceeds a load threshold. A load threshold or a network load threshold can indicate a capacity at which a base station is deemed congested. Upon recognizing that the base station exceeds a load threshold, monitored network data, an indication of exceeding the load threshold, etc. can be communicated to the policy server 216. Alternatively, the monitor 218 may communicate monitored network data to the policy server 216 continually, periodically, upon an occurrence of another event, or the like.

The policy server 216 can be configured to make network control determinations and/or device control determinations using such data received from the monitor 218. In some cases, the policy server 216 may also utilize one or more policies or policy attributes accessible by the policy server 216. For instance, the policy server 216 may receive an indication that the base station 208 is at or near capacity and, thereafter, may utilize policy attributes to determine which, if any, user devices to transfer to another base station; to which base station(s) to transfer user devices; which, if any, user devices to apply performance variance (e.g., throttle or upgrade), etc.

Additionally or alternatively, the monitor 218 can communicate network control determinations and/or device control determinations to the policy server 216. As can be appreciated, in some cases, the monitor 218 may communicate particular network control determinations and/or device control determinations (e.g., determinations based on monitored network data exceeding a particular threshold(s), a decision based on throttling or upgrading performance of a user device, user, application, or server, a decision to transfer a device from one base station to another base station, or the like). Even in cases that the monitor 218 communicates a network control determination and/or a device control determination to the policy server 216, the policy server 216 may be configured to utilize such information to make other network control determinations and/or device control determinations or to affirm or override such determinations made by a monitor.

By way of example only, assume that a monitor determines that a particular base station has a heavy load while another base station has a light load. Such information can be communicated to the policy server 216 to make a determination of which user device(s) should transfer base stations and/or to which base station(s) should a particular user device(s) transfer. In this regard, a monitor 218 may determine that user device 202 should transfer base stations as the base station currently being used by the user device 202 has a high load, and policy server 216 may determine that the user device 202 should transfer from base station 208 to base station 210 as base station 210 has a lighter load and the first user device 202 can maintain a strong signal strength with base station 210. Alternatively, either the monitor 218 or the policy server 216 may make both determinations.

The policy server 216 can enforce network control determinations and/or device transfer determinations and/or can initiate utilization of the gateway 214, the controller 212, the base stations 208 and 210, and/or the user devices 202 or 204 to enforce the determinations. In this regard, the policy server 216 may provide an indication to the gateway 214 to transfer the first user device 202 from base station 208 to base station 210. The gateway 214 may provide such an indication to the controller 212, which communicates the information to the first user device 202. The first user device 202 can then reconfigure its settings such that it connects with the base station 210 to initiate a communication event or continue an ongoing communication event.)). In some cases, the user device may be provided with an indication to transfer to another base station. If the base station is designated, the user device may transfer connection to the designated base station. If the base station to which to transfer is not designated, the user device may identify another acceptable base station to which to transfer (e.g., another base station with an acceptable signal strength, etc.) and, thereafter, transfer connection to the identified base station. By way of another example, the policy server 216 can initiate throttling or upgrading performance of a user device user, application, or server (e.g., either by the policy server 216, the gateway 214, or via another network component(s).

By way of example only, and with continued reference to FIG. 2, assume that user device 202 is initially utilizing base station 208 for a communication event. Further assume that, during the communication event, monitor 218 is at least monitoring network data associated with the base station 208 and the base station 210. While monitoring such network data, suppose the monitor 218 recognizes that a portion of monitored network data associated with base station 208 exceeds a threshold indicating that the user device 202 should transfer to another base station having a lower load. In such a case, the monitor 218 may provide the policy server 216 with an indication that the user device 202 should transfer from base station 208 to another base station with less congestion. The monitor 218 may additionally or alternatively provide the policy server 216 with data regarding loads of various base stations, such as base station 208 and base station 210. In some cases, the monitor 218 may also provide a suggested base station to which to transfer (e.g., base station 210).

In accordance with receiving such information, the policy server 216 may make a determination that the first user device 202 should transfer from base station 208 to base station 210. As previously mentioned, the policy server 216 may reference policies or policy attributes to make such a determination. For instance, the policy server 216 may confirm that an acceptable signal strength would exist between the first user device 202 and base station 210. The policy server 216 can initiate communication of such a determination to the first user device 202 via the gateway 214 and controller 212. Upon the user device 202 receiving a notification to transfer to base station 210, the user device 202 can begin utilizing the base station 210 to continue the communication event. The base station 208 may now be available for usage by the second user device 204. As can be appreciated, transferring the first user device 202 from base station 208 to base station 210 may similarly occur at initiation of a communication event (e.g., during a communication event setup). Although the present example describes the monitor 218 as recognizing that the user device 202 should transfer to another base station and the policy server 216 identifies such a base station, as can be appreciated either component may make such determinations (e.g., the monitor may identify an excessive load regarding one base station and the policy server 216 may identify which user device(s) to transfer and to which base station(s) to transfer).

Figure 3:
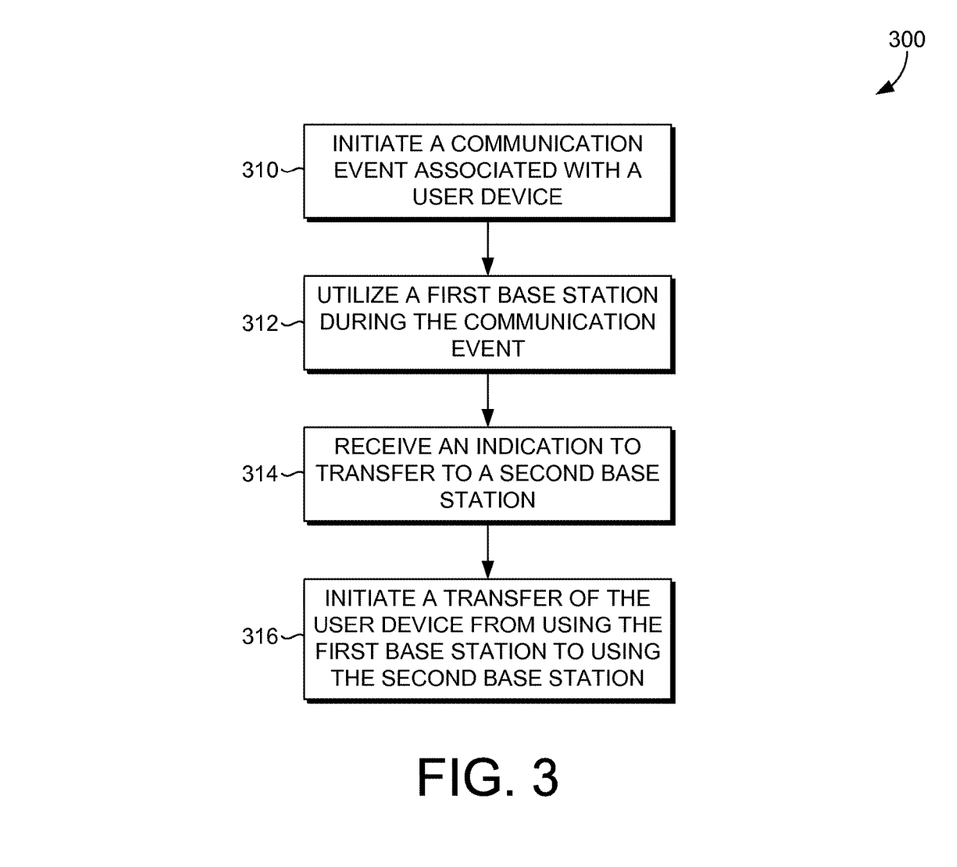
FIG. 3 provides an exemplary first method for controlling network loads, in accordance with an embodiment of the present invention.

With reference to FIG. 3, a flow diagram is shown illustrating a method 300 for controlling network load, in accordance with an embodiment of the present invention. In embodiments, method 300 can be performed at a user device, such as user device 202 of FIG. 2. Initially, as indicated at block 310, a communication event associated with a user device is initiated. A communication event may be, for example, a voice call, a text message, a data session, a media session, etc. At block 312, a first base station is utilized during the communication event. In this regard, the user device connects with the first base station to establish or participate in the communication event. At block 314, an indication to transfer to a second base station is received. Such an indication may be received in response to monitoring the network and identifying that the first base station is at or near capacity (e.g., a load associated therewith exceeded a predetermined load threshold). Subsequently, at block 316, a transfer of the user device from using the first base station to using the second base station is initiated. In embodiments, the indication to transfer to a second base station may designate a particular base station to which to transfer. Alternatively, the user device may identify a particular second base station to which to transfer, for example, based on signal strength, line of sight, distance between mobile device and base station, etc.

Figure 4:
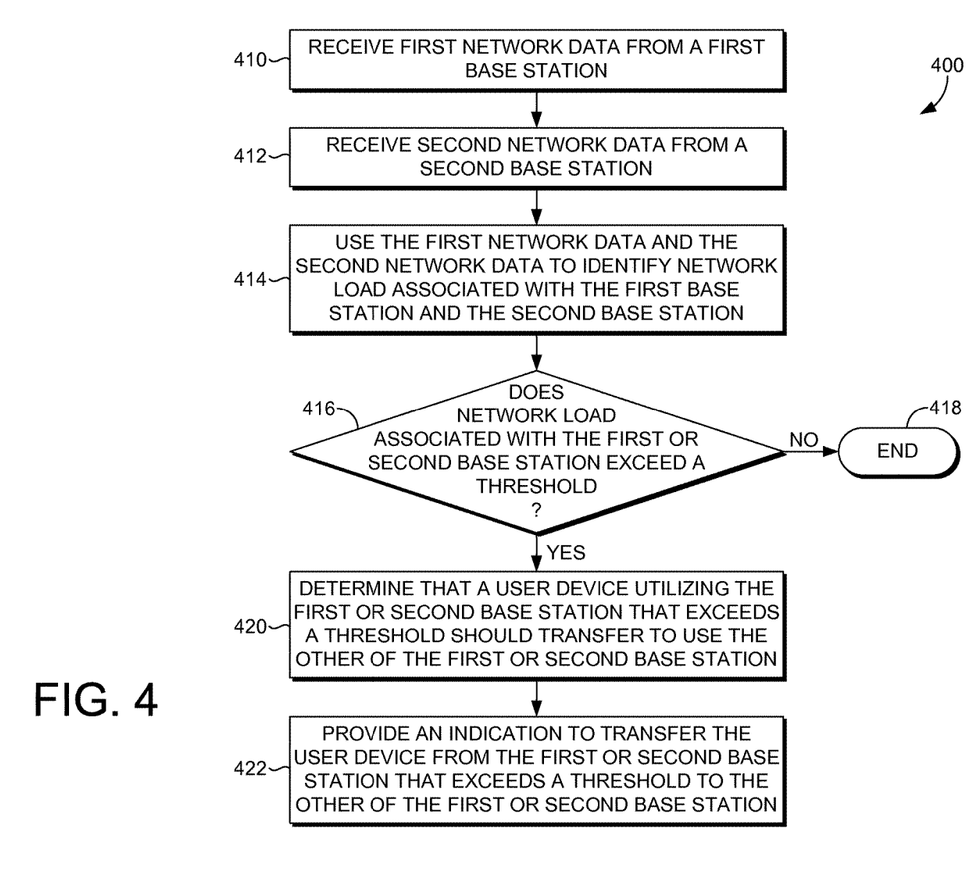
FIG. 4 provides an exemplary second method for controlling network loads, in accordance with an embodiment of the present invention.

Referring now to FIG. 4, a flow diagram is shown illustrating a method 400 for controlling network load, in accordance with an embodiment of the present invention. In embodiments, method 400 can be performed, for example, at a monitor, such as monitor 218 of FIG. 2. Initially, as indicated at block 410, first network data is received from a first base station. At block 412, second network data is received from a second base station. The first network data and the second network data is used to identify network load associated with the first base station and the second base station, as indicated at block 414. At block 416, it is determined whether network load associated with the first or second base station exceeds a threshold (e.g., a load threshold that indicates load of the base station). If the network load associated with the first or second base station does not exceed a threshold, the method ends at block 418. On the other hand, if the network load associated with the first or second base station exceeds a threshold, at block 420, it is determined that a user device utilizing the first or second base station that exceeds a threshold should transfer to use the other of the first or second base station that does not exceed a threshold. Subsequently, at block 422, an indication to transfer the user device from the first or second base station that exceeds a threshold to the other of the first or second base station that does not exceed a threshold is provided. Such an indication may be provided, for example, to a policy server. In some cases, an indication that simply indicates that the user device should transfer to another base station (e.g. without designating a base station to which to transfer) may be provided and, thereafter, another component, such as a policy server or user device, can determine which base station to which the user device should transfer. As can be appreciated, multiple components can be used to carry out method 400 of FIG. 4. For instance, a policy server may make a determination to transfer the user device and provide the indication to transfer the user device.

Figure 5:
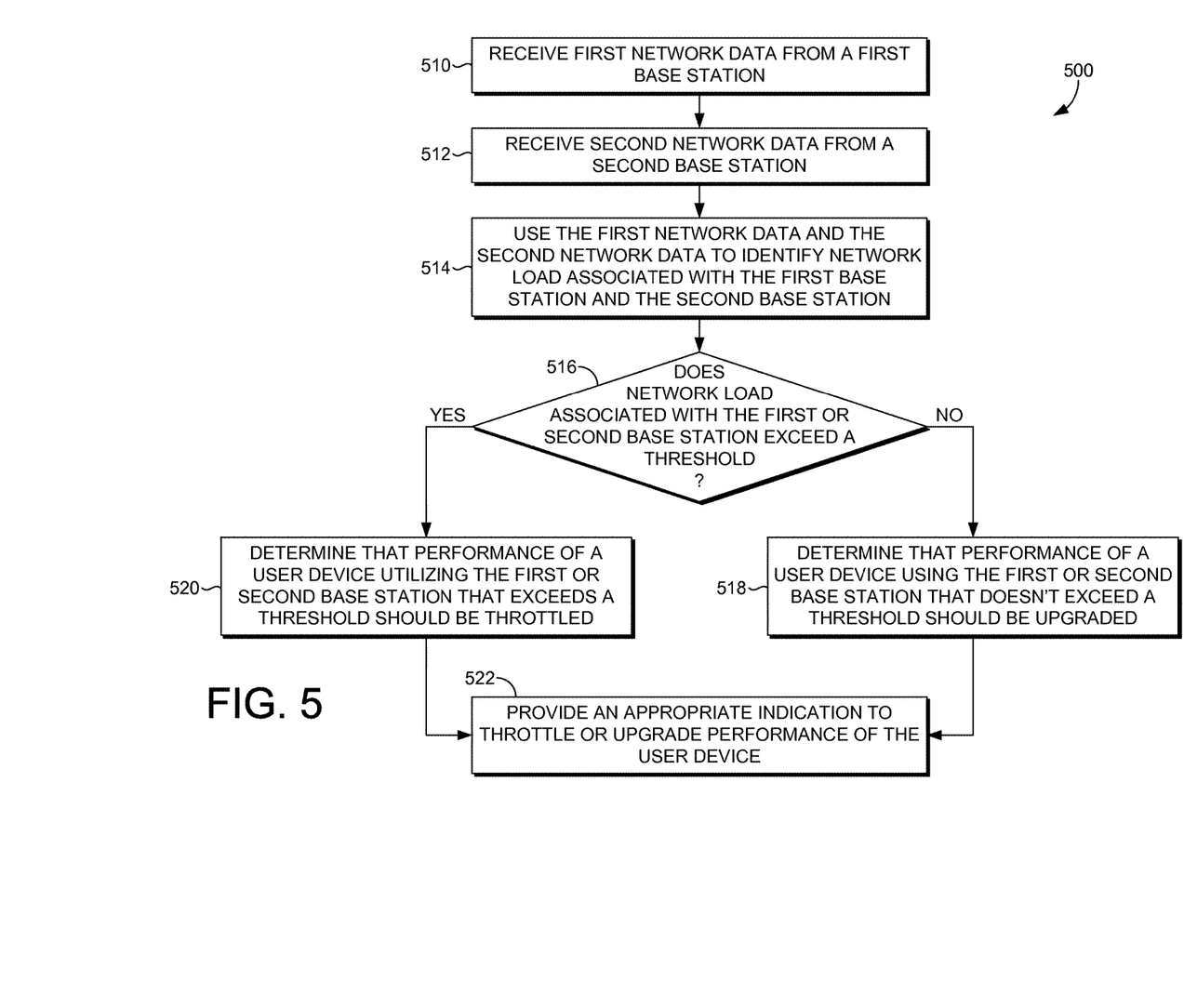
FIG. 5 provides an exemplary third method for controlling network loads, in accordance with an embodiment of the present invention.

With reference to FIG. 5, a flow diagram is shown illustrating a method 500 for controlling network load, in accordance with an embodiment of the present invention. In embodiments, method 500 can be performed, for example, at a monitor, such as monitor 218 of FIG. 2. Initially, as indicated at block 510, first network data is received from a first base station. At block 512, second network data is received from a second base station. The first network data and the second network data is used to identify network load associated with the first base station and the second base station, as indicated at block 514. At block 516, it is determined whether network load associated with the first or second base station exceeds a threshold. If the network load associated with the first or second base station does not exceed a threshold, at block 418, it is determined that performance of a user device using the first or second base station that does not exceed a threshold should be upgraded. On the other hand, if the network load associated with the first or second base station exceeds a threshold, at block 420, it is determined that performance of a user device utilizing the first or second base station that exceeds a threshold should be throttled or downgraded. Following the determination at block 518 and block 520, an appropriate indication to throttle or upgrade performance of the user device is provided, as indicated at block 522. Such an indication may be provided, for example, to a policy server. In some cases, an indication that simply indicates that the user device performance should be modified may be provided and, thereafter, another component, such as a policy server, can determine whether to upgrade or downgrade performance associated with a particular user device, user, application, etc., and/or an amount associated therewith. As can be appreciated, multiple components can be used to carry out method 500 of FIG. 5. For instance, a policy server may make a determination to throttle or upgrade performance of the user device and provide the indication to modify a performance level of the user device.

Figure 6:
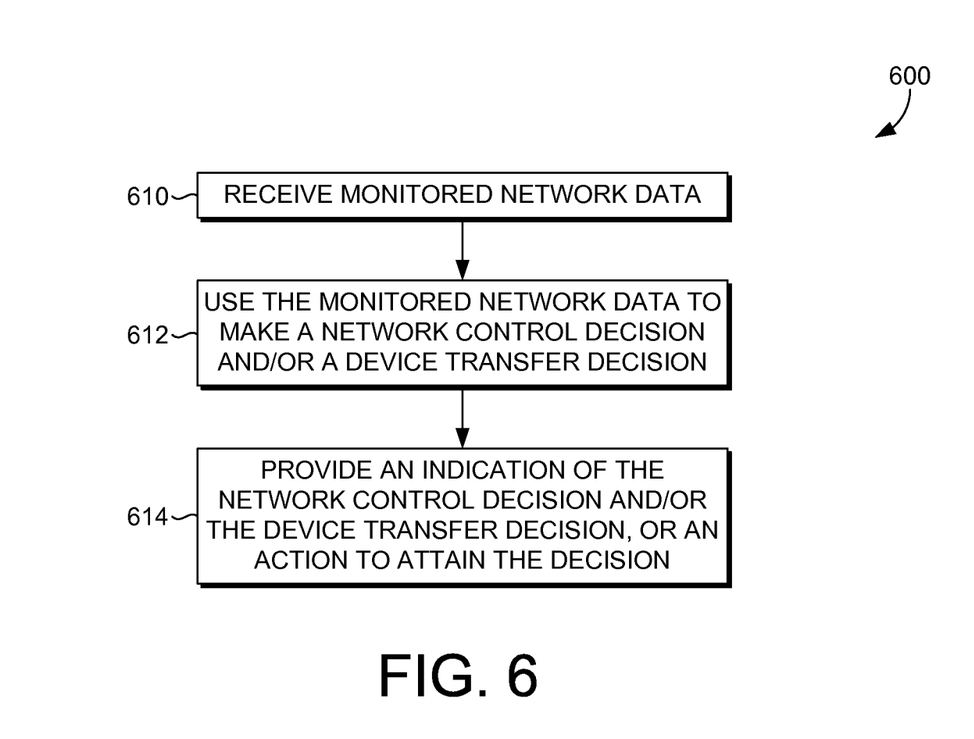
FIG. 6 provides an exemplary fourth method for controlling network loads, in accordance with an embodiment of the present invention.

Turning now to FIG. 6, a flow diagram is shown illustrating a method 600 for controlling network load, in accordance with an embodiment of the present invention. In embodiments, method 600 can be performed, for example, at a policy server, such as policy server 216 of FIG. 2. Initially, at block 610, monitored network data is received. Monitored network data may include, for example, raw network data initially communicated from a network element such as a base station, controller, or gateway; processed data (e.g., calculated data, aggregated data); or the like. The monitored network data may be communicated from a monitor, for example, upon an occurrence of an event (e.g., a threshold is exceeded by monitored network data). At block 612, the monitored network data can be used to make a network control determination and/or a device transfer determination. Such determinations may include, for instance, whether to transfer one or more devices from a base station to another base station, to which base station(s) to transfer one or more devices, whether to modify performance level (e.g., upgrade or downgrade) associated with one or more devices, etc. One or more policy or policy attributes can be referenced and utilized to make network control and/or device transfer determinations. For instance, although it might be recognized that the a device should transfer from one base station to another base station, such policy attributes can be used to confirm that another base station can provide acceptable services to the user device (e.g., an acceptable signal strength or other performance indications). Upon making a network control determination and/or a device transfer determination, an indication of such a determination(s), or an action to attain the determination, can be provided, as indicated at block 614. Such a determination may be provided, for example to a gateway(s), a controller(s), a base station(s), and/or a user device(s).

It will be understood by those of ordinary skill in the art that the order of steps shown in the method 300 of FIG. 3, method 400 of FIG. 4, method 500 of FIG. 5, and method 600 of FIG. 6 are not meant to limit the scope of the present invention in any way and, in fact, the steps may occur in a variety of different sequences within embodiments hereof. Any and all such variations, and any combination thereof, are contemplated to be within the scope of embodiments of the present invention.

Many different arrangements of the various components depicted, as well as components not shown, are possible without departing from the scope of the claims below. Embodiments of our technology have been described with the intent to be illustrative rather than restrictive. Alternative embodiments will become apparent readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. One or more non-transitory computer-readable media having computer-executable instructions embodied thereon that, when executed, perform a method for facilitating control of network loads, the method comprising:
   receiving, at a policy server, a communication comprising a first indication that a network load of a first base station operating in a network exceeds a network load threshold, wherein the network load is identified based on monitored network data of the first base station, wherein the communication includes a second indication that a user device in communication with the first base station should transfer to a second base station, wherein a network load of the second base station does not exceed the network load threshold;
   determining, at the policy server, that the user device should have its performance level modified in a communication session with the first base station instead of transferring to the second base station, the determination based on a policy attribute of the user device that is determined from subscription information associated with the user device, the policy attribute specifying whether the user device should be transferred to the second base station or have its performance level modified in the communication session with the first base station when the network load of the first base station exceeds the network load threshold and the network load of the second base station does not exceed the network load, wherein the policy server's determination overrides the second indication that the user device in communication with the first base station should transfer to the second base station; and
   based on the policy server's determination, modifying the performance level of the user device in the communication session with the first base station to at least partially reduce the network load on the first base station.

2. The media of claim 1, wherein modifying the performance level of the user device comprises downgrading the performance level, and wherein the performance level modification is initiated by a monitor.

3. The media of claim 2, wherein modifying the performance level of the user device comprises downgrading the performance level, and wherein the performance level modification is initiated by the policy server.

4. The media of claim 1, further comprising upgrading a performance level of another user device using the second base station based on a policy attribute of the another user device.

5. The media of claim 1, wherein the network load threshold indicates a capacity at which a base station is determined to be congested.

6. The media of claim 1, further comprising providing a third indication to the user device and to the first base station that the performance level of the user device is being downgraded.

7. The media of claim 1, further comprising transferring another user device to the second base station based on a policy attribute of the another user device determined from a subscription profile associated with the another user device in order to lower the network load of the first base station.

8. A method for facilitating control of network loads, the method comprising:
receiving, at a policy server, a communication comprising a first indication that a network load of a first base station operating in a network exceeds a network load threshold, wherein the network load is identified based on monitored network data of the first base station, and wherein the communication includes a second indication that a user device in communication with the first base station should transfer to a second base station, wherein a network load of the second base station does not exceed the network load threshold;
determining, at the policy server, that the user device should have its performance level modified, the determination based on a policy attribute of the user device that is determined from subscription information associated with the user device, the policy attribute specifying whether the user device should be transferred to the second base station or have its performance level in a communication session with the first base station modified when the network load of the first base station exceeds the network load threshold and the network load of the second base station does not exceed the network load, wherein the policy server's determination overrides the second indication that the user device in communication with the first base station should transfer to the second base station; and
modifying, based on the policy server's determination, the performance level of the user device in the communication session with the first base station to at least partially reduce the network load on the first base station, wherein the modifying of the performance level of the user device relative to the first base station comprises instructing a gateway that the performance of the user device should be modified.

9. The method of claim 8, wherein the communication session with the first base station comprises an exchange of data between the user device and the first base station.

10. The method of claim 8, wherein the network load threshold indicates a capacity at which the first base station is determined to be congested.

11. The method of claim 8, wherein modifying the performance level of the user device comprises downgrading the performance level.

12. The method of claim 8, wherein the second indication that the user device in communication with the first base station should transfer to the second base station identifies the second base station.

13. The method of claim 12, wherein signal strength of the user device is utilized to determine the second base station.

14. The method of claim 8, wherein the modifying of the performance level of the user device comprises downgrading the performance level of a particular application.

15. The method of claim 8, further comprising upgrading a performance level of another user device relative to the second base station based on a policy attribute of the another user device.

16. A system for facilitating control of network loads, the system comprising:

one or more non-transitory computer-readable media having computer-executable instructions embodied thereon that, when executed by one or more processors perform a method comprising:
(1) monitoring network data of a first base station and a second base station;
(2) identifying, based on the monitored network data of each of the first and second base stations, that a network load of the first base station exceeds a network load threshold and a network load of the second base station does not exceed the network load threshold;
(3) determining that a user device in communication with the first base station should transfer to the second base station, based on the network load of the first base station exceeding the network load threshold and the network load of the second base station not exceeding the network load threshold; and
(4) communicate to a policy server an indication that the user device in communication with the first base station should transfer to the second base station, based on the network load of the first base station exceeding the network load threshold and the network load of the second base station not exceeding the network load threshold;
the policy server configured to:
(5) receive the communication comprising the indication that a user device in communication with the first base station should transfer to the second base station, based on the network load of the first base station exceeding the network load threshold and the network load of the second base station not exceeding the network load threshold;
(6) determine that the user device should have its performance level modified, the determining based on a policy attribute of the user device that is determined from subscription information associated with the user device, the policy attribute indicating whether the user device should be transferred or have its performance level modified when the network load of the first base station exceeds the network load threshold, wherein the policy server's determination overrides the monitor's determination; and
(7) modify the performance level of the user device relative to the first base station to at least partially reduce the network load on the first base station.

17. The system of claim 16, further comprising a gateway component, the gateway component configured to:
receive an instruction from the policy server that the performance level of the user device should be modified; and
modify the performance level of the user device relative to the first base station according to the indication from the policy server.

18. The system of claim 16, wherein the modifying of the performance level of the user device comprises downgrading the performance level.

19. The system of claim 18, wherein the modifying of the performance level of the user device comprises downgrading the performance level of a particular application.

20. The system of claim 18, wherein the modifying of the performance level of the user device comprises downgrading the performance level of a particular server.

* * * * *